United States Patent

Mitani

(10) Patent No.: US 6,527,228 B2
(45) Date of Patent: Mar. 4, 2003

(54) AIRCRAFT ENVIRONMENT CONTROLLER

(75) Inventor: Hisashi Mitani, Osaka (JP)

(73) Assignee: Shimadzu Corporation, Kyoto (JP)

( * ) Notice: Subject to any disclaimer, the term of this patent is extended or adjusted under 35 U.S.C. 154(b) by 55 days.

(21) Appl. No.: 09/926,343

(22) PCT Filed: Mar. 9, 2001

(86) PCT No.: PCT/JP01/01843
§ 371 (c)(1),
(2), (4) Date: Oct. 16, 2001

(87) PCT Pub. No.: WO01/68448
PCT Pub. Date: Sep. 20, 2001

(65) Prior Publication Data
US 2002/0162915 A1 Nov. 7, 2002

(30) Foreign Application Priority Data
Mar. 13, 2000 (JP) .............................. 2000-069159

(51) Int. Cl.[7] .............................................. B64D 13/06
(52) U.S. Cl. .................................. 244/118.5; 454/76
(58) Field of Search ................... 244/53 R, 118.5; 454/71, 74, 76; 95/47

(56) References Cited

U.S. PATENT DOCUMENTS

| 4,508,548 A | 4/1985 | Manatt ......................... 96/8 |
| 4,681,602 A | 7/1987 | Glenn et al. ..................... 95/47 |
| 5,069,692 A | 12/1991 | Grennan et al. .................. 96/4 |
| 5,791,982 A | * 8/1998 | Curry et al. .......... 244/118.5 X |
| 5,911,388 A | * 6/1999 | Severson et al. ........ 244/118.5 |

FOREIGN PATENT DOCUMENTS

| EP | 0 808 769 A2 | 11/1997 |
| EP | 0 842 847 A1 | 5/1998 |
| JP | 1-95996 | 4/1989 |
| JP | 3-31099 | 2/1991 |
| JP | 3-86699 | 4/1991 |

OTHER PUBLICATIONS

Copy of Supplementary European Search Report.

* cited by examiner

Primary Examiner—Robert P. Swiatek
(74) Attorney, Agent, or Firm—Armstrong, Westerman & Hattori, LLP

(57) ABSTRACT

An environment control unit for an airplane is configured so that air is drawn out of a cabin (2), oxygen and water molecules alone are separated from the drawn air by a selective permeable membrane (21), the permeated oxygen and water is supplied to the cabin (2) again. The remaining nitrogen is supplied to a fuel tank (41) in order to prevent explosion, it is possible to reduce the amount of air extracted from an engine (1) that is required to facilitate respiration for passengers and to prevent explosion.

8 Claims, 1 Drawing Sheet

AIRCRAFT ENVIRONMENT CONTROLLER

FIELD OF THE ART

This invention relates to an environment control unit for an airplane, more specifically, to an energy-saving control unit for environment, such as temperature, pressure or oxygen partial pressure in an airplane.

BACKGROUND ART

An airplane is generally provided with an environment control unit for the airplane. The environment control unit extracts compressed air of high-temperature and high-pressure from an engine or an auxiliary power portion, to regulate temperature and pressure with an air conditioning portion and then to supply the regulated air to a pressurized chamber such as a cabin or a cockpit. The environment control unit serves a variety of roles, such as to control pressure in a pressurized chamber, to supply oxygen to the pressurized chamber comfortable enough for humans, to regulate humidity in the pressurized chamber and to control air conditioning in the pressurized chamber.

The above-mentioned air conditioning portion, for example, one comprises an air cycle machine and the other that does not comprise any air cycle machine wherein the former comprises an air cycle machine is so arranged that air extracted from an engine is regulated for temperature and pressure and the regulated air is supplied to a pressurized chamber by the use of the air cycle machine where a compressor is uniaxially connected with a turbine and the latter one that does not comprise any air cycle machine is so arranged that air extracted from an engine is pre-refrigerated with a heat exchanger and supplied to a pressurized chamber. The air in the pressurized chamber is further refrigerated by the use of a vapor cycle machine mainly comprising a coolant cycle circuit having the capacity to deal with the maximum air conditioning load.

However, the amount of air extracted from an engine and consumed by the above-mentioned environment control unit accounts for about 3 percent of usual air-flow rate of the engine, which is considered to be a serious penalty. More specifically, a hundred-passenger airplane requires about 100 (lb./min) of the maximum amount of air during the maximum air conditioning load. In addition, about 1% of the air-flow rate of the engine is extracted from the engine in order to prevent explosion due to lightning or short circuit if there exists fuel vapor in an inflammable portion, such as a fuel tank. This penalty of air to be extracted directly results in deterioration in propulsive force or fuel efficiency.

For a conventional environment control unit it is difficult to provide the pressurized chamber with enough humidity, which makes passengers uncomfortable such as being thirsty.

Further, recent trends make a jet engine highly bypassed, which makes it difficult to extract a lot of air from the engine.

In order to solve the above problems the present claimed invention intends to provide an environment control unit for an airplane which can cut down an amount of air extracted so as to improve fuel efficiency and produce required cooling capacity with a simple arrangement.

DISCLOSURE OF THE INVENTION

The environment control unit for an airplane in accordance with the present claimed invention is so arranged that air of high-temperature and high-pressure is extracted from an engine or an auxiliary power portion of an airplane. The extracted air is regulated in temperature and pressure by an air conditioning portion and then the regulated air is supplied to a pressurized chamber. The extracted air is characterized by air expelled from the pressurized chamber or air drawn out of the pressurized chamber is separated into air enriched with nitrogen and air enriched with oxygen. The air enriched with oxygen is supplied to the pressurized chamber again and the air enriched with nitrogen is supplied to an inflammable portion such as a fuel tank.

In accordance with the arrangement, oxygen alone out of the air drawn from the pressurized chamber is supplied to the pressurized chamber again. This makes it possible to maintain oxygen concentration at a level sufficient for passengers in the pressurized chamber be comfortable even though an amount of air to be extracted for supplying fresh air is reduced by the maximum of 30 percent. In addition, it is possible to prevent explosion in an inflammable portion, such as a fuel tank, without the necessity of air to being extracted exceeding the amount necessary for air conditioning, namely, without deteriorating propulsive force nor fuel efficiency. It improves safety of the airplane that air enriched with nitrogen is supplied to an inflammable portion. As a result, it is possible to reduce the amount of air to be extracted significantly without deteriorating the reliability of the airplane nor comfort for the passengers, thereby to improve fuel efficiency and propulsive force.

Especially, that the air in the pressurized chamber whose temperature and pressure has once been regulated is utilized makes it possible to reduce the burden for the air conditioning portion significantly when compared with a case in which the air of high-temperature and high-pressure is regulated from the outset.

In case the environment control unit is provided with an auxiliary air conditioning portion that refrigerates air drawn from the pressurized chamber to a circulation line and supplies the air to the pressurized chamber again through the circulation line. This is effective if the air enriched with oxygen is supplied to the pressurized chamber by making use of the circulation line of the auxiliary air conditioning portion. If the air drawn from the pressurized chamber to the circulation line is refrigerated by a vapor cycle system, it is possible to reduce amount of air extracted from the engine significantly.

An example embodiment represented is air exhausted from the pressurized chamber or air drawn out of the pressurized chamber is separated into air enriched with nitrogen and air enriched with oxygen and vapor using a permeable membrane which can selectively permeate a molecule by compressing the air. In this case it is possible to keep humidity in the pressurized chamber at a suitable level so as to prevent for passengers from being uncomfortable by feeling thirsty.

Another example embodiment is represented by air exhausted from the pressurized chamber or air drawn out of the pressurized chamber is separated into air enriched with nitrogen and air enriched with oxygen and vapor by the use of a material which can selectively adsorb a molecule.

In this case it is preferable that a plurality of materials that selectively adsorb molecules are provided and used in turns.

BEST MODES OF EMBODYING THE INVENTION

Figure 1:
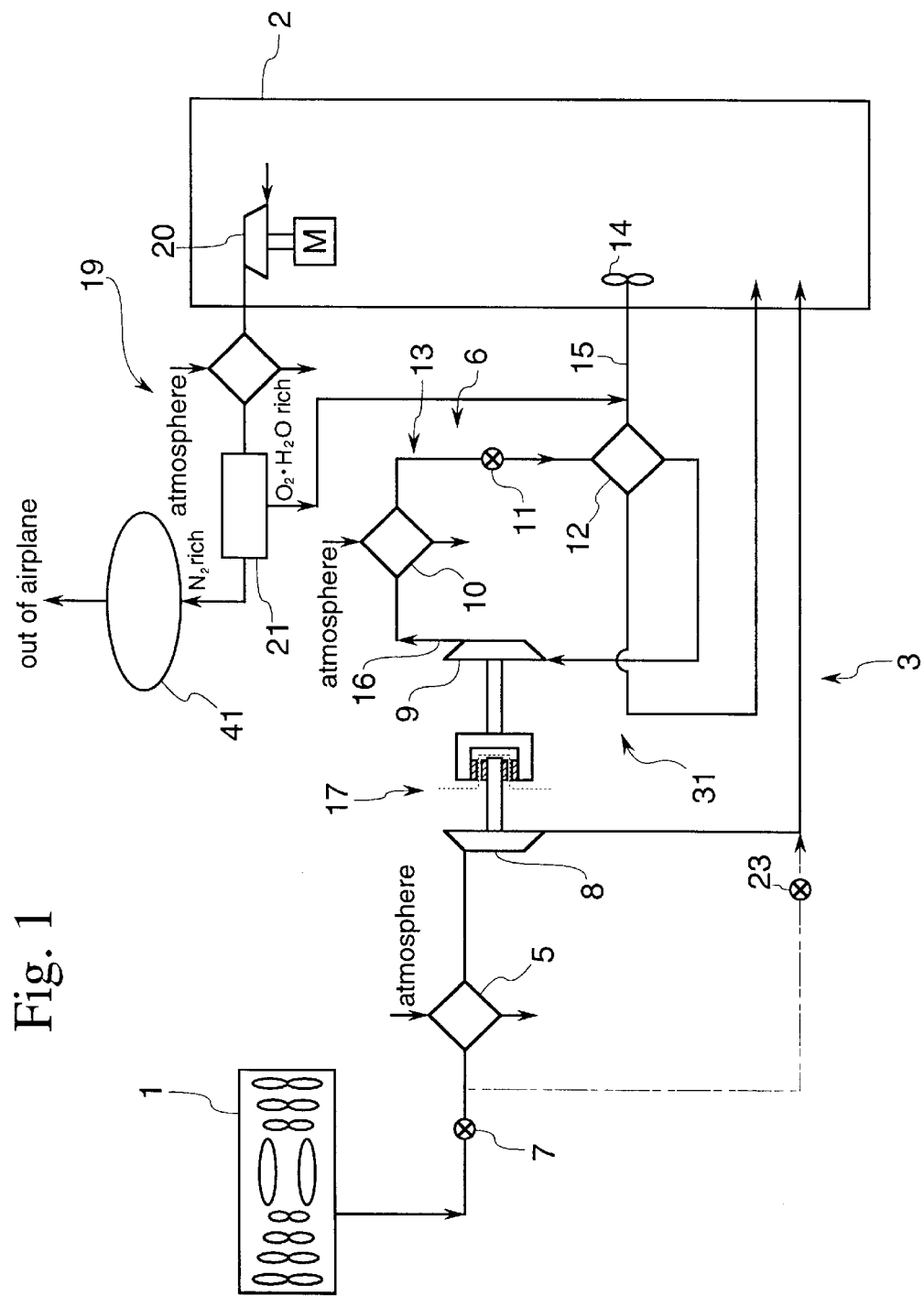
FIG. 1 is a system diagram showing an embodiment of the present claimed invention.

The invention will be described in detail with reference to an embodiment thereof shown in the accompanying drawings.

An environment control unit for an airplane in accordance with this embodiment comprises an air conditioning portion 3 and an auxiliary air conditioning portion 31 wherein the air conditioning portion 3 extracts air of high-temperature and high-pressure from an engine 1, pre-refrigerates the extracted air and supplies the pre-refrigerated air to a cabin 2 as a pressurized chamber. The auxiliary air conditioning portion 31 draws air from the cabin 2 again and refrigerates it. Next the air conditioning portion 3 and the auxiliary air conditioning portion 31 will be described more specifically. The air conditioning portion 3 first regulates the pressure of air extracted from the engine 1 by the use of a pressure regulating valve 7 and then heat-exchanges the regulated air with open air by the use of a heat exchanger 5 so as to pre-refrigerate it and next lowers the temperature of the heat-exchanged air by making use of adiabatic expansion by means of a turbine 8 and finally supplies the air to the cabin 2. Water is separated by the use of a water separator, not shown in drawings, when the airplane flies at a low-altitude during summer with a lot of humidity. This is because water is generated due to condensation when the air is pre-refrigerated by the heat exchanger 5.

The auxiliary air conditioning portion 31 refrigerates the air in the cabin 2 that has been drawn into a circulation line 15 by a circulation fan 14 with the use of a vapor cycle system 6 and supplies the refrigerated air to the cabin 2 again through the circulation line 15. More specifically, the vapor cycle system 6 mainly comprises a coolant cycle circuit 13 that is so arranged that air passes through a centrifugal compressor 9, a condenser 10, an expansion valve 11 and a vaporizer 12 in succession. Alternative chlorofluorocarbons that can provide a thermal cycle by making use of phase change are sealed as a coolant 16 into the coolant cycle circuit 13. The air in the cabin 2 is introduced into the vaporizer 12 through the circulation line 15 and refrigerated by making use of evaporation of the coolant 16 that takes heat contained in the air in the cabin 2. The coolant 16 that comes out of the evaporator 12 is forced to a state of high-pressure and high-temperature by the centrifugal compressor 9 for the coolant 16 that is connected with a turbine 8 through a magnetic coupling 17. The coolant 16 of high-pressure and high-temperature is introduced into the condenser 10 and then liquefied because of heat dissipation due to heat exchange with open air. The liquidized coolant 16 is introduced into the evaporator 12 again through the expansion valve 11 and then vaporized since heat is deprived from the atmosphere due to expansion. The centrifugal compressor 9 drives when energy generated when the extracted air expands in the turbine 8 transmitted as driving energy.

The environment control unit for an airplane of this embodiment further comprises an oxygen extracting portion 19 that draws the air from the cabin 2, takes an oxygen and water molecule only out of the air drawn from the cabin 2 and supplies the oxygen and water molecule to the cabin 2 again.

The oxygen extracting portion 19 extracts a part of the air from the cabin 2, compresses it with a compression ratio of about 3.5 by the use of an electric compressor 20. It then separates it into air enriched with nitrogen ($N_2$ rich) and air enriched with oxygen and vapor ($O_2H_2O$ rich) by the use of a selectively permeable membrane 21 which permeates an oxygen molecule and a water molecule and then supplies the air enriched with oxygen and vapor into the cabin 2 again by making use of the circulation line 15. More specifically, the air enriched with oxygen and vapor that is introduced into the circulation line 15 is mixed with the air in the cabin 2 and then refrigerated by the evaporator 12. The nitrogen that does not permeate the selectively permeable membrane 21 is introduced into a fuel tank 41 as air enriched with nitrogen and overflow air enriched with nitrogen is discharged out of the airplane.

In accordance with the embodiment of the environment control unit for an airplane, oxygen alone out of the air drawn from the cabin 2 is supplied to the cabin 2 again. This makes it possible to maintain oxygen concentration at a level sufficient for passengers in the cabin 2 to spend comfortably even though an extracting amount of air for supplying fresh air is reduced by the maximum of 30 percent. In addition, it is possible to prevent explosion in the fuel tank 41 without the necessity of extracted air exceeding the amount necessary for air conditioning, namely, without deteriorating propulsive force nor fuel efficiency. To supply air enriched with nitrogen with an inflammable portion improves safety of the airplane. As a result, it is possible to reduce the amount of extracted air significantly without deteriorating the reliability of the airplane nor comfort for the passengers, thereby improving fuel efficiency and propulsive force.

This is especially the case when the air in the cabin 2 whose temperature and pressure has once been regulated is utilized makes it possible to reduce a burden for the air conditioning portion 3 by far when compared with a case in which the air of high-temperature and high-pressure is regulated from the onset.

In addition, since the oxygen extracting portion 19 in accordance with the embodiment makes use of the circulation line 15 for refrigerating the air in the cabin 2, it is possible to omit another arrangement for supplying the air enriched with oxygen and vapor to the cabin 2, thereby reducing space and cost. Further, this makes it possible to furnish the oxygen extracting portion 19 to an existing air conditioning without any complicated work.

In case that the airplane cruises at a high altitude, the temperature of the airplane surface rises due to heat generated by passengers or electronic equipment. This leads the air conditioning into a slight cooling mode even at extremely low atmosphere temperature (approximate minus 60 degrees Celsius). In this case, there is no need of refrigerating the air down with the vapor cycle system 6. The air that is refrigerated by the heat exchanger 5 and the extracted air whose temperature is controlled by a temperature control valve 23 are mixed with by-passed air as shown by imaginary line in FIG. 1 and supplied to the cabin 2. Needless to say the above-mentioned effect can also be produced with this arrangement.

This arrangement of parts is not limited to the above-described embodiment. For example, a modified form of the oxygen extracting portion may be represented by that air is separated into air enriched with nitrogen and air enriched with oxygen by the use of a material such as zeolite which can adsorb molecules selectively. More specifically, a plurality pieces of zeolite are prepared. Oxygen molecules alone are adsorbed out of the extracted air by the use of a piece of zeolite until this zeolite is saturated with oxygen molecules and then the next oxygen molecules only are adsorbed out of the extracted air by the use of another waiting zeolite molecule until this zeolite is saturated with oxygen molecules. While the later zeolite is adsorbing oxygen molecules, oxygen molecules are drawn out of the former saturated zeolite and supplied to the cabin 2 and then the former zeolite is waiting until the later zeolite is saturated with oxygen molecules. In accordance with this arrangement in which a plurality pieces of zeolite are alternatively used, not only the above-mentioned effects are produced but also it can save the effort of compressing the air in the cabin 2 prior to separation into the air enriched with nitrogen and the air enriched with oxygen, thereby making the arrangement simple.

In addition, air enriched with oxygen and vapor may be made of air exhausted from the cabin, and further, may be made of air extracted from the auxiliary power portion. As if the pressurized chamber, there may be a chamber for electronic equipment or a cockpit in addition to the cabin.

In addition, the air conditioning portion may further comprise an air cycle machine. For example, there may be represented by that air extracted from an engine is refrigerated by the use of a heat exchanger and then the air is compressed by a compressor of the air cycle machine and refrigerated again and next the air is expanded by a turbine of the air cycle machine so as to obtain refrigerated air. The refrigerated air is then supplied to the pressurized chamber. In this case also the previously mentioned effect can be produced.

Further the coolant is not limited to alternatives to chlorofluorocarbons, but may be hydrocarbon or ammonia.

The other arrangement of the component may be variously modified without departing from the spirit of the invention.

POSSIBLE APPLICATIONS IN INDUSTRY

As mentioned above, in accordance with the present claimed invention, it is possible to reduce an amount of air to be extracted that is required to supply fresh air while sufficient oxygen can be supplied to a pressurized chamber. It is also possible to prevent explosions at an inflammable portion due to lightning without extracting air, more than necessary, as well. As mentioned, it is possible not only to reduce the amount of air to be extracted without deteriorating reliability of the airplane nor comfort for passengers, but also to reduce burden on the air conditioning, portion because it can utilize air in the pressurized chamber which has already been regulated, thereby to improve fuel efficiency and driving force and to improve performance of the airplane by leaps and bounds as well.

Further, it is possible for an airplane loaded with a high-performance engine or a business jet which requires less ventilation, by nature, to reduce an amount of air extracted from the engine significantly if a vapor cycle system is jointly used.

If air exhausted from the pressurized chamber or air drawn out of the pressurized chamber is separated into air enriched with nitrogen and air enriched with oxygen and vapor by the use of a permeable membrane which can selectively permeate a molecule by compressing the air. It is also possible to provide suitable humidity in the pressurized chamber so as to make passengers comfortable in addition to the above-described effect.

If air exhausted from the pressurized chamber or air drawn out of the pressurized chamber is separated into air enriched with nitrogen and air enriched with oxygen and vapor by the use of a material which can selectively adsorb a molecule, no compressor is necessary, thereby to provide the environment control unit for an airplane which can produce the above-described effect with a simple arrangement and less space required.

What is claimed is:

1. An environment control unit for an airplane wherein air of high-temperature and high-pressure is extracted from an engine or an auxiliary power portion of an airplane, the extracted air is regulated in temperature and pressure by an air conditioning portion and then the regulated air is supplied to a pressurized chamber, wherein air exhausted from the pressurized chamber or air drawn out of the pressurized chamber is separated into air enriched with nitrogen and air enriched with oxygen, the air enriched with oxygen is supplied to the pressurized chamber again and the air enriched with nitrogen is supplied to an inflammable portion further comprising:

an auxiliary air conditioning portion that refrigerates air drawn from the pressurized chamber to a circulation line and supplies the air to the pressurized chamber again and the air enriched with oxygen is supplied to the pressurized chamber by making use of the circulation line of the auxiliary air conditioning portion.

2. The environment control unit for an airplane described in claim 1 and characterized by that the air drawn from the pressurized chamber to the circulation line is refrigerated by a vapor cycle system.

3. The environment control unit for an airplane described in claim 1 or 2 and characterized by that air exhausted from the pressurized chamber or air drawn out of the pressurized chamber is separated into air enriched with nitrogen and air enriched with oxygen and vapor by the use of a permeable membrane which can selectively permeate a molecule by compressing the air.

4. The environment control unit for an airplane described in claim 3, and characterized by that air exhausted from the pressurized chamber or air drawn out of the pressurized chamber is separated into air enriched with nitrogen and air enriched with oxygen and vapor by the use of a material which can selectively adsorb a molecule.

5. The environment control unit for an airplane described in claim 3 and characterized by that air exhausted from the pressurized chamber or air drawn out of the pressurized chamber is separated into air enriched with nitrogen and air enriched with oxygen and vapor by the use of material which can selectively adsorb a molecule.

6. The environment control unit for an airplane described in claim 5, wherein a of materials that selectively adsorb molecules are provided and used by turns.

7. The environment control unit for an airplane described in claim 1, or 2 and characterized by that air exhausted from the pressurized chamber or air drawn out of the pressurized chamber is separated into air enriched with nitrogen and air enriched with oxygen and vapor by the use of a material which can selectively adsorb a molecule.

8. The environment control unit for an airplane described in claim 7, wherein a plurality of materials that selectively adsorb molecules are provided and used by turns.

* * * * *

UNITED STATES PATENT AND TRADEMARK OFFICE
CERTIFICATE OF CORRECTION

PATENT NO.    : 6,527,228 B2
DATED         : March 4, 2003
INVENTOR(S)   : Mitani, Hisashi It is certified that error appears in the above-identified patent and that said Letters Patent is hereby corrected as shown below:

<u>Column 6,</u>
Line 48, "wherein a of materials" should be -- wherein a plurality of materials --

Signed and Sealed this

Twenty-third Day of September, 2003

JAMES E. ROGAN
*Director of the United States Patent and Trademark Office*